US009964058B2

(12) United States Patent
Kurtz et al.

(10) Patent No.: US 9,964,058 B2
(45) Date of Patent: May 8, 2018

(54) SYSTEM AND METHOD FOR INCREASING FUEL ECONOMY OF A VEHICLE INCLUDING A SCR CATALYST

(75) Inventors: Eric Kurtz, Dearborn, MI (US); Paul Joseph Tennison, West Bloomfield, MI (US); William Charles Ruona, Farmington Hills, MI (US); Waheed Alashe, Northville, MI (US); David A. May, Dearborn, MI (US); Joshua Putman Styron, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1694 days.

(21) Appl. No.: 13/438,740

(22) Filed: Apr. 3, 2012

(65) Prior Publication Data

US 2013/0261930 A1    Oct. 3, 2013

(51) Int. Cl.
| | | |
|---|---|---|
| *F01N 9/00* | (2006.01) | |
| *F02D 41/02* | (2006.01) | |
| *F02D 21/08* | (2006.01) | |
| *F01N 3/20* | (2006.01) | |
| *F02B 39/04* | (2006.01) | |
| *F02D 41/40* | (2006.01) | |
| *F02D 41/38* | (2006.01) | |
| *F02D 41/00* | (2006.01) | |

(52) U.S. Cl.
CPC ......... *F02D 41/0235* (2013.01); *F01N 3/208* (2013.01); *F02B 39/04* (2013.01); *F02D 21/08* (2013.01); *F02D 41/005* (2013.01); *F02D 41/401* (2013.01); *F01N 2610/142* (2013.01); *F01N 2900/1814* (2013.01); *F02D 41/0007* (2013.01); *F02D 41/3836* (2013.01); *Y02A 50/2325* (2018.01); *Y02T 10/24* (2013.01); *Y02T 10/44* (2013.01); *Y02T 10/47* (2013.01)

(58) Field of Classification Search
CPC ....... F01N 2560/026; F01N 2900/1622; F01N 11/00; F01N 3/2073; F01N 3/208; F01N 2610/02; Y02T 10/24; Y02T 10/47
USPC .......... 701/102; 60/285, 274, 286, 295, 277, 60/297, 276
See application file for complete search history.

(56) References Cited

U.S. PATENT DOCUMENTS

| | | | |
|---|---|---|---|
| 7,587,889 B2 | 9/2009 | Frazier et al. | |
| 2006/0086080 A1* | 4/2006 | Katogi et al. | 60/278 |
| 2010/0024397 A1* | 2/2010 | Chi et al. | 60/285 |
| 2010/0122525 A1* | 5/2010 | Fujita et al. | 60/285 |

(Continued)

FOREIGN PATENT DOCUMENTS

WO    2010065963 A2    6/2010

OTHER PUBLICATIONS

Partial Translation of Office Action of Chinese Patent Application No. 201310113930.3, dated Mar. 23, 2017, State Intellectual Property Office of PRC, 9 pages.

*Primary Examiner* — Hai Huynh
*Assistant Examiner* — Gonzalo Laguarda
(74) *Attorney, Agent, or Firm* — Julia Voutyras; McCoy Russell LLP

(57) ABSTRACT

Methods and systems for increasing fuel economy of a vehicle including a SCR catalyst are presented. In one example, an amount of EGR provided to an engine is decreased in response to performance of the SCR being within a predetermined range of performance. The methods and systems may increase vehicle fuel economy while vehicle tailpipe emissions are achieved.

20 Claims, 6 Drawing Sheets

(56) References Cited

U.S. PATENT DOCUMENTS

2011/0023855 A1* 2/2011 Van Nieuwstadt et al. .. 123/703
2011/0072798 A1* 3/2011 Herman ........................ 60/286
2011/0162350 A1* 7/2011 Ponnathpur .................. 60/274
2011/0247316 A1   10/2011 Dobkov et al.
2011/0265457 A1* 11/2011 Sato ............................. 60/285

* cited by examiner

SYSTEM AND METHOD FOR INCREASING FUEL ECONOMY OF A VEHICLE INCLUDING A SCR CATALYST

BACKGROUND/SUMMARY

Engine operation can be adjusted to improve engine emissions or fuel economy. However, engine adjustments (e.g., EGR amount and fuel injection timing) that increase fuel economy can also increase engine emissions. One way to improve tailpipe emissions without extremely increasing fuel consumption is to adjust an exhaust gas recirculation (EGR) amount provided to the engine and process engine exhaust with a selective catalyst reduction system (SCR). Increasing the EGR amount supplied to the engine may reduce engine feedgas NOx without extremely increasing fuel consumption. Further, a SCR positioned in an engine exhaust system processing exhaust gas can reduce feedgas NOx to provide lower vehicle tail-pipe NOx emissions. In this way, tailpipe NOx can be decreased via a combination of EGR and exhaust after treatment devices. However, engine fuel economy may decrease somewhat when EGR is increased. As a result, engine fuel economy may be less than is desired.

The inventors herein have recognized the above-mentioned disadvantages and have developed a method for operating an engine, comprising: adjusting an EGR amount supplied to an engine in response to an amount of $NH_3$ stored within a SCR catalyst and an amount of urea stored in a tank.

By decreasing an EGR amount supplied to an engine when efficiency of a SCR catalyst is high, it may be possible to improve vehicle fuel economy while meeting a desired level of emissions. For example, efficiency of a SCR catalyst may be high when an amount of $NH_3$ stored within the SCR catalyst is greater than a threshold level. As such, the engine may be operated at more fuel efficient conditions via decreasing EGR while tailpipe emissions are maintained below a threshold level by the efficiently operating SCR catalyst. Further, the EGR amount supplied to the engine may be adjusted in response to an amount of urea remaining in a tank when the tank is not substantially empty. Such operation may allow the system to improve engine fuel economy while limiting use of urea to provide a desired interval between urea tank refills.

The present description may provide several advantages. Specifically, the approach may reduce engine emissions and improve engine fuel economy. In addition, the approach may also help to provide a desired interval between urea tank refills. Further, the approach may reduce urea injection during periods when SCR catalyst efficiency is high to extend a urea tank refill interval.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
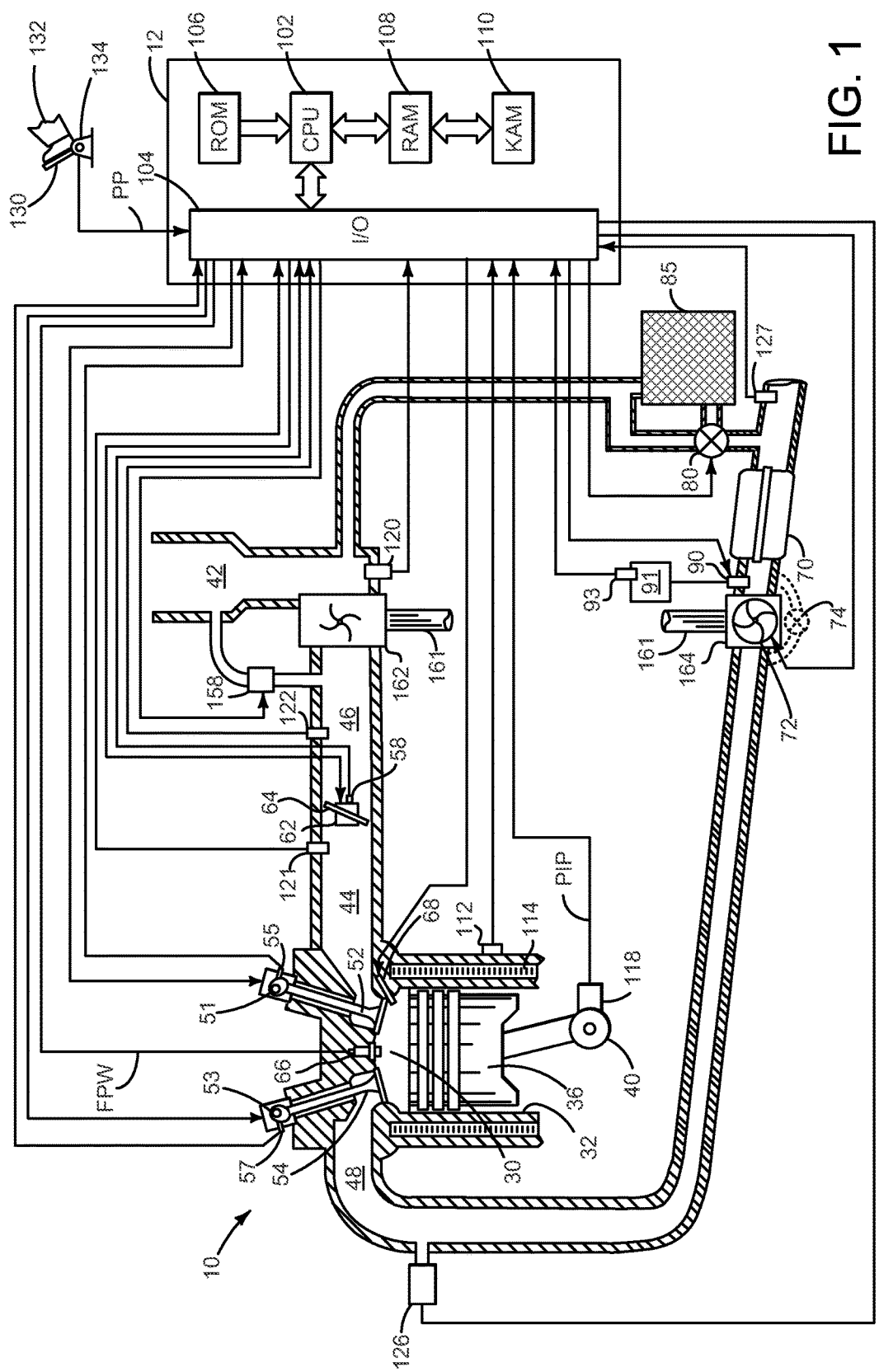
FIG. 1 shows a schematic depiction of an engine.
Figure 2:
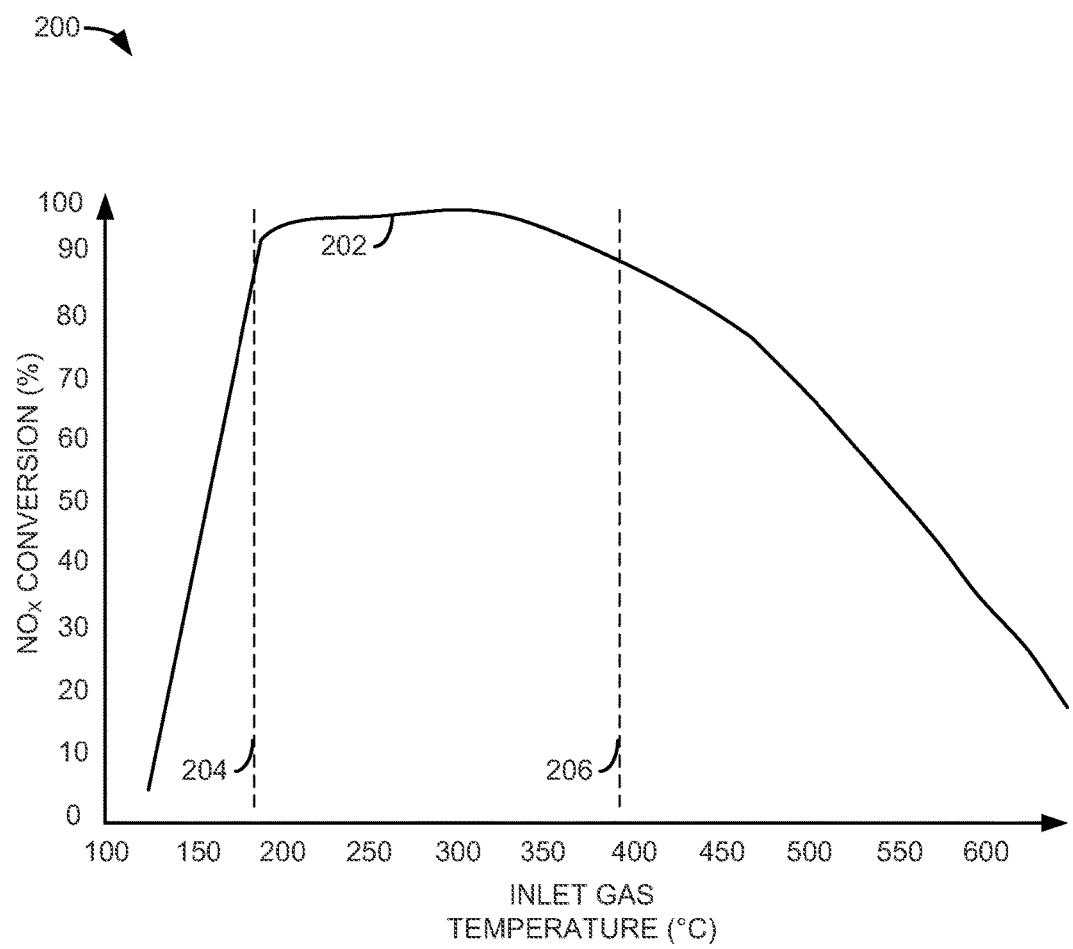
FIG. 2 shows a plot of SCR catalyst conversion efficiency versus SCR catalyst inlet gas temperature.
Figure 3:
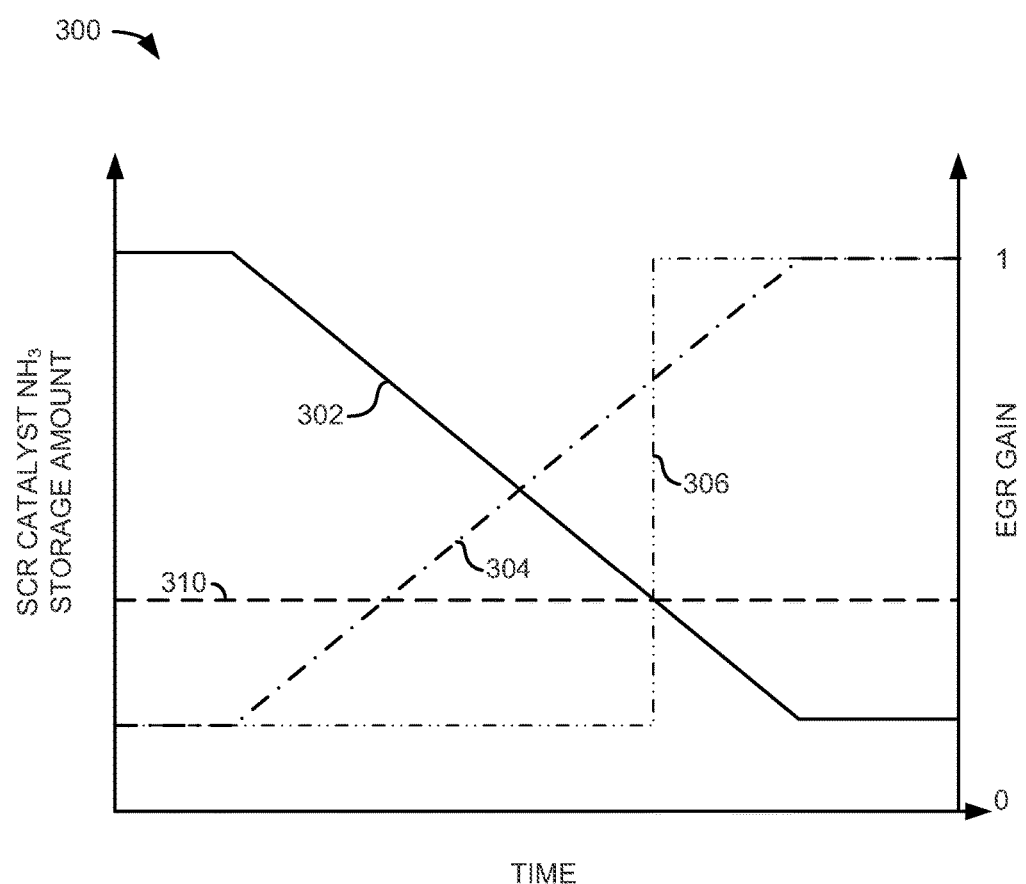
FIG. 3 shows a plot of SCR catalyst $NH_3$ storage level and EGR gain versus time.
Figure 4:
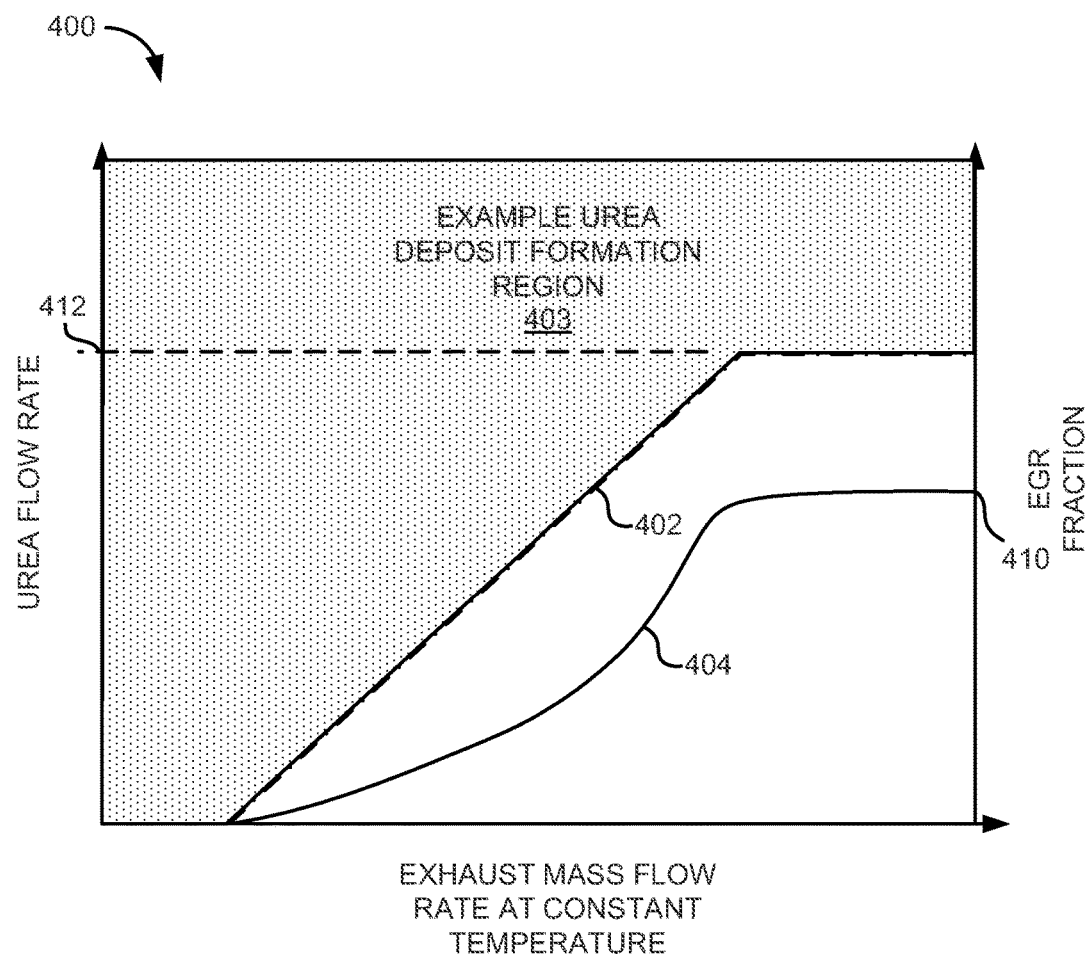
FIG. 4 is a plot showing an example urea deposit formation region and EGR fraction limiting based on urea flow rate limits related to urea deposits.

The present description is related to improving fuel economy of a vehicle having an SCR catalyst. FIG. 1 shows one example of a boosted diesel engine where the method of FIG. 5 may adjust engine operating conditions to reduce fuel consumption when a SCR catalyst is operating in a highly efficient operating region. FIG. 2 shows an example SCR catalyst conversion efficiency plot that identifies a temperature range where engine fuel consumption may be reduced during engine operation. FIG. 3 shows examples of ways that EGR may be adjusted in response to SCR $NH_3$ storage. In some examples, urea flow to an exhaust system is limited to reduce the possibility of deposit formation as shown in FIG. 4. A method for reducing engine fuel consumption for an engine that includes a SCR catalyst is provided in FIG. 5. Finally, an example vehicle in which the method of FIG. 5 may be applied is shown in FIG. 6.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into combustion chamber 30, which is known to those skilled in the art as direct injection. Fuel injector 66 delivers fuel in proportion to the pulse width of signal FPW from controller 12. Fuel is delivered to fuel injector 66 by a fuel system including a fuel tank (not shown), fuel pump (not shown), fuel pump control valve (not shown), and fuel rail (not shown). In addition, a metering valve may be located in or near the fuel rail for closed loop fuel control. A pump metering valve may also regulate fuel flow to the fuel pump, thereby reducing fuel pumped to a high pressure fuel pump.

Intake manifold 44 is shown communicating with optional electronic throttle 62 which adjusts a position of throttle plate 64 to control air flow from intake boost chamber 46. Compressor 162 draws air from air intake 42 to supply boost chamber 46. Exhaust gases spin turbine 164 which is coupled to compressor 162 via shaft 161. In some examples, a charge air cooler may be provided. Compressor speed may be adjusted via adjusting a position of variable vane control 72 or compressor bypass valve 158. In alternative examples, a waste gate 74 may replace or be used in addition to variable vane control 72. Variable vane control 72 adjusts a position of variable geometry turbine vanes. Exhaust gases can pass through turbine 164 supplying little energy to rotate turbine 164 when vanes are in an open position. Exhaust gases can pass through turbine 164 and impart increased force on turbine 164 when vanes are in a closed position. Alternatively, wastegate 74 allows exhaust gases to flow around turbine 164 so as to reduce the amount of energy supplied to the turbine. Compressor bypass valve 158 allows compressed air at the outlet of compressor 162 to be returned to the input of compressor 162. In this way, the efficiency of compressor 162 may be reduced so as to affect the flow of compressor 162 and reduce intake manifold pressure.

Combustion is initiated in combustion chamber 30 when fuel automatically ignites as piston 36 approaches top-dead-center compression stroke. In some examples, a universal Exhaust Gas Oxygen (UEGO) sensor 126 may be coupled to exhaust manifold 48 upstream of emissions device 70. Further, in some examples, the UEGO sensor may be a NOx sensor that has both NOx and oxygen sensing elements. NOx sensor 127 samples tailpipe NOx downstream of SCR 70.

At lower engine temperatures glow plug 68 may convert electrical energy into thermal energy so as to raise a temperature in combustion chamber 30. By raising temperature of combustion chamber 30, it may be easier to ignite a cylinder air-fuel mixture via compression.

Emissions device 70 can include SCR catalyst bricks, in one example. In another example, multiple emission control devices, each with multiple bricks, can be used. Emissions device 70 can include an oxidation catalyst in one example. In other examples, the emissions device may include a lean NOx trap followed by a selective catalyst reduction (SCR), and/or a diesel particulate filter (DPF). Urea may be injected upstream of SCR catalyst 70 via urea injector 90. Urea injector 90 receives urea from urea tank 91. Level sensor 93 senses the amount of urea stored in urea tank 91.

Exhaust gas recirculation (EGR) may be provided to the engine via EGR valve 80. EGR valve 80 is a three-way valve that closes or allows exhaust gas to flow from downstream of emissions device 70 to a location in the engine air intake system upstream of compressor 162. In alternative examples, EGR may flow from upstream of turbine 164 to intake manifold 44. EGR may bypass EGR cooler 85, or alternatively, EGR may be cooled via passing through EGR cooler 85. In other, examples high pressure and low pressure EGR system may be provided.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a measurement of engine manifold pressure (MAP) from pressure sensor 121 coupled to intake manifold 44; boost pressure from pressure sensor 122; exhaust gas oxygen concentration from oxygen sensor 126; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle. In a process hereinafter referred to as ignition, the injected fuel is ignited by compression ignition resulting in combustion. During the expansion stroke, the expanding gases push piston 36 back toward BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC.

Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Referring now to FIG. 2, a plot of SCR catalyst conversion efficiency versus SCR catalyst inlet gas temperature is shown. Plot 200 represents an example of NOx conversion efficiency for emissions device 70 of FIG. 1. The Y axis represents NOx conversion efficiency in percentage. The X axis represents SCR inlet gas temperature in degrees C.

SCR efficiency curve 202 shows that emissions control device 70 has low NOx conversion efficiency at temperatures below 150° C. For example, NOx conversion efficiency at 150° C. is about 40 percent and lower for lower inlet gas temperatures. NOx conversion efficiency increases rapidly and reaches about 90 percent at about 185° C. as indicated by vertical marker 204. NOx conversion efficiency of emissions control device 70 increases slowly at temperatures above 185° C. and approaches 100 percent efficiency. Near 390° C., NOx conversion efficiency is reduced back to about 90 percent as indicated by vertical marker 206. NOx conversion efficiency continues to decrease as SCR inlet temperature continues to increase. In this example, the region between vertical marker 204 and 206 may be a predetermined SCR catalyst operating region where engine parameters are adjusted to improve engine fuel economy.

Thus, it may be observed that it may be desirable to operate the SCR in a temperature range that provides a desired level of efficiency (e.g., 90 percent or above). When the SCR operates in a highly efficient region, it may be possible to reduce engine fuel consumption and still provide a desired tailpipe emission level (e.g., engine exhaust emissions that may have been processed and emitted to atmosphere). By decreasing an amount of EGR supplied to the engine, engine fuel economy may be improved while higher levels of engine feed gas (e.g., engine out gas) emissions are converted via an emissions control device that operates in a higher efficiency region. Additionally, injection timing and/or spark timing may be advanced to further reduce engine fuel consumption during conditions when the emission control device is operating in the higher efficiency region.

Referring now to FIG. 3, a plot of SCR catalyst $NH_3$ storage amount and EGR gain versus time is shown. In particular, plot 300 shows two examples of how an EGR amount supplied to an engine may be adjusted in response to an amount of $NH_3$ stored within a SCR catalyst.

A first Y axis represents an amount of $NH_3$ stored in a SCR. The amount of $NH_3$ stored increases in the direction of the Y axis arrow. A second Y axis represents EGR gain. EGR gain increases in the direction of the Y axis arrow. The X axis represents time and time increases from the left side of FIG. 3 to the right side of FIG. 3.

In one example, the EGR gain represents a multiplier applied to interpolate between a base EGR amount and a FE mode EGR amount that are stored in separate tables. For example, the base EGR amount may be 30% while the FE mode EGR amount is 23%. The base EGR is subtracted from the FE mode EGR and then multiplied by the EGR gain. The result is added to the base EGR and the EGR amount is revised. The fuel injection timing, fuel pressure, boost, and other parameters may be adjusted similarly.

The base EGR amount and the FE EGR amount may be based on engine speed, engine load, and engine coolant temperature as described at 514 and 526. Note that the base EGR amount may vary with engine speed, load, and temperature such that a plurality of different EGR amounts are provided to the engine at a plurality of different engine speeds, loads, and temperatures. The EGR gain may be a value of between 0 and 1. In one example, the EGR gain has a value of less than 1 when the SCR catalyst $NH_3$ storage amount is greater than a predetermined SCR storage amount where SCR catalyst efficiency is expected to be greater than a threshold efficiency. The EGR multiplier may be increase toward 1 when the SCR catalyst storage amount decreases from the threshold amount of $NH_3$. Thus, if the SCR catalyst is not operating in a predetermined range where SCR storage amount is greater than a predetermined threshold, the engine may operate with the base EGR amount.

Curve 302 represents an amount of $NH_3$ stored within a SCR catalyst. The amount of $NH_3$ stored within a SCR catalyst also corresponds to a percentage of utilized SCR $NH_3$ storage capacity. Curve 302 shows the amount of $NH_3$ stored within the SCR catalyst decreasing as time increases. The amount of $NH_3$ stored within the SCR may decrease when $NH_3$ is consumed converting NOx to $N_2$ and $H_2O$.

Curves 304 and 306 illustrate two different schedules for adjusting EGR gain. Curve 304 increases the EGR gain as the amount of $NH_3$ stored within the SCR catalyst decrease. Curve 304 decreases the EGR gain as the amount of $NH_3$ stored within the SCR catalyst increases. Thus, the EGR gain reduces the amount of EGR delivered to an engine when the SCR catalyst is operating in an efficient region when the amount of $NH_3$ stored within the SCR increases. Further, the EGR gain increases the amount of EGR delivered to the engine when the SCR catalyst is operating in an efficient region when the amount of $NH_3$ stored within the SCR decreases. Curve 304 is shown increasing linearly as stored $NH_3$ decreases. However, the EGR gain may be non-linear if desired.

Curve 306 shows a step-wise change in EGR gain when the amount of $NH_3$ stored on the SCR is at or less than a predetermined amount of $NH_3$ stored as is indicated by horizontal line 310. For example, the EGR gain may change from a value of 0.8 to 1.0 when the amount of $NH_3$ stored in a SCR catalyst is less than a threshold. Further, as mentioned above, the EGR gain may be adjusted in response to a percentage of $NH_3$ storage capacity that is utilized or conversely a percentage of $NH_3$ storage capacity that is not utilized. The predetermined amount of $NH_3$ indicated by horizontal line 310 may be adjusted for operating conditions so that the EGR gain changes at a different level than is indicated in FIG. 3.

Referring now to FIG. 4, an example plot of a urea deposit formation region and EGR fraction limiting based on the urea deposit formation is shown. The approach described for FIG. 4 may be applied in the method of FIG. 5.

Plot 400 shows an example region 403 where deposits may form from injecting urea into an exhaust system. In one example, it may be determined that deposits begin to form in an exhaust system when a urea flow rate exceeds a threshold flow rate at a prescribed engine exhaust flow rate and temperature. Curve 402 is an example boundary where deposits begin to form in an exhaust system when urea is injected to the exhaust system. In this example, curve 402 indicates urea deposits begin to form at lower urea flow rates when the exhaust mass flow rate is low. As the exhaust mass flow rate increases, the urea flow rate must also increase for deposits to form in the exhaust system. Deposits form in the exhaust system when the urea flow rate reaches the threshold level indicated at 412. Thus, urea deposits continue to form even though the exhaust mass flow rate continues to increase.

In some examples, the urea flow rate may be limited to less than the level indicated at 412 so that urea deposits do not form in the exhaust system. In this way, the urea amount may be limited in response to an amount of deposits that may form in an exhaust system.

Curve 404 represents an amount of EGR that may be provided to an engine. Curve 404 may be representative of an EGR amount provided at a constant engine speed. Further, it should be recognized that the shape of 404 is for illustration purposes only and is not intended to limit or narrow the description in any way. Curve 404 is shown at a low level at low exhaust mass flow rates indicting that little EGR flows to the engine at lower engine speeds and loads. Curve 404 increases and indicates that additional EGR is provided to the engine as engine mass flow increases. However, the EGR amount reaches a limit as indicated by 410 when increasing the exhaust mass flow no longer helps to prevent urea deposits. Consequently, the EGR amount is limited in response to a urea flow rate above which deposits may form in the exhaust system. In other words, the EGR amount and urea flow rate are limited in response to formation of urea deposits in the exhaust system.

Figure 5:
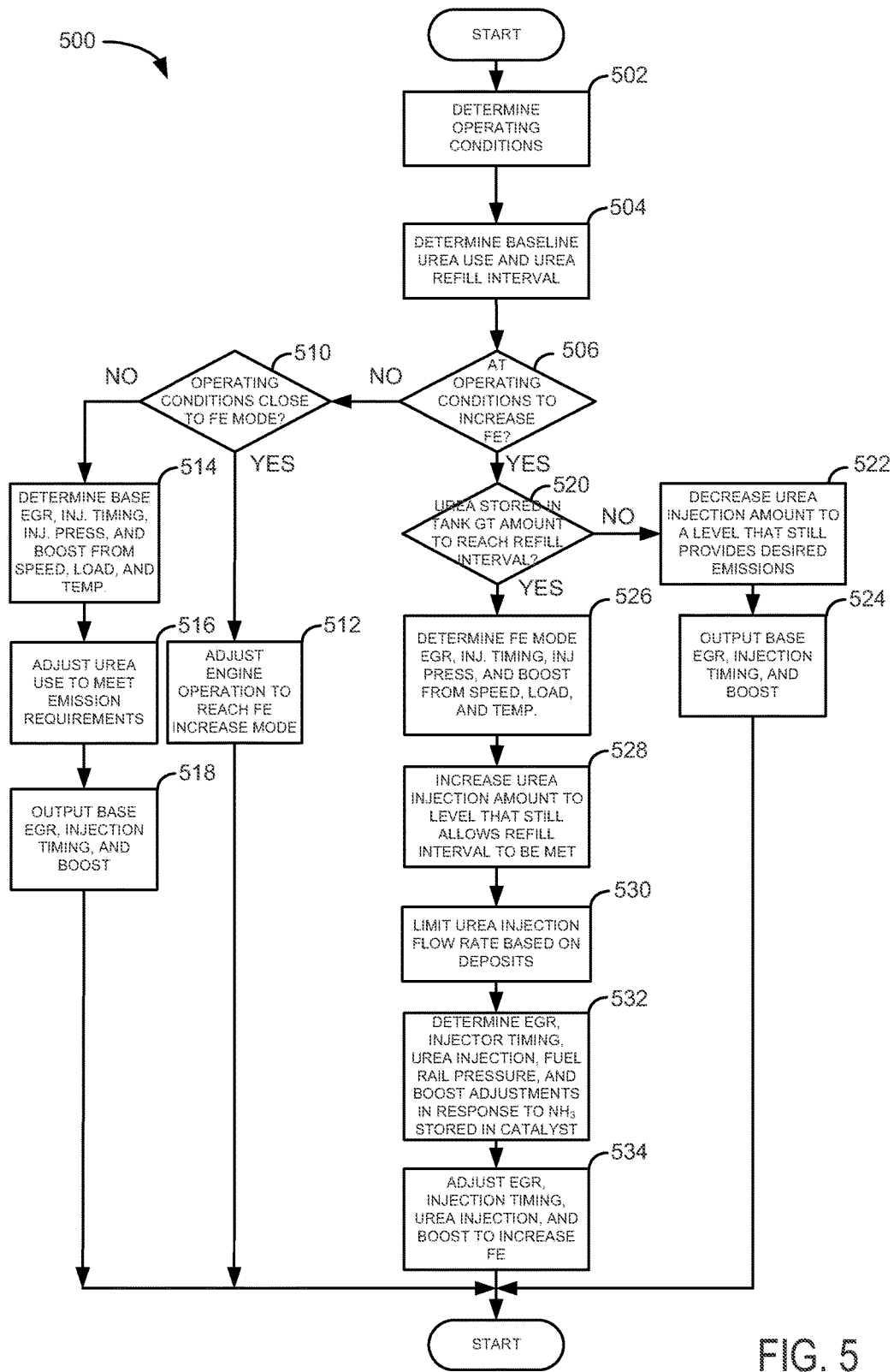
FIG. 5 is an example flow chart of a method for increasing fuel economy of a vehicle having a SCR catalyst.
Figure 6:
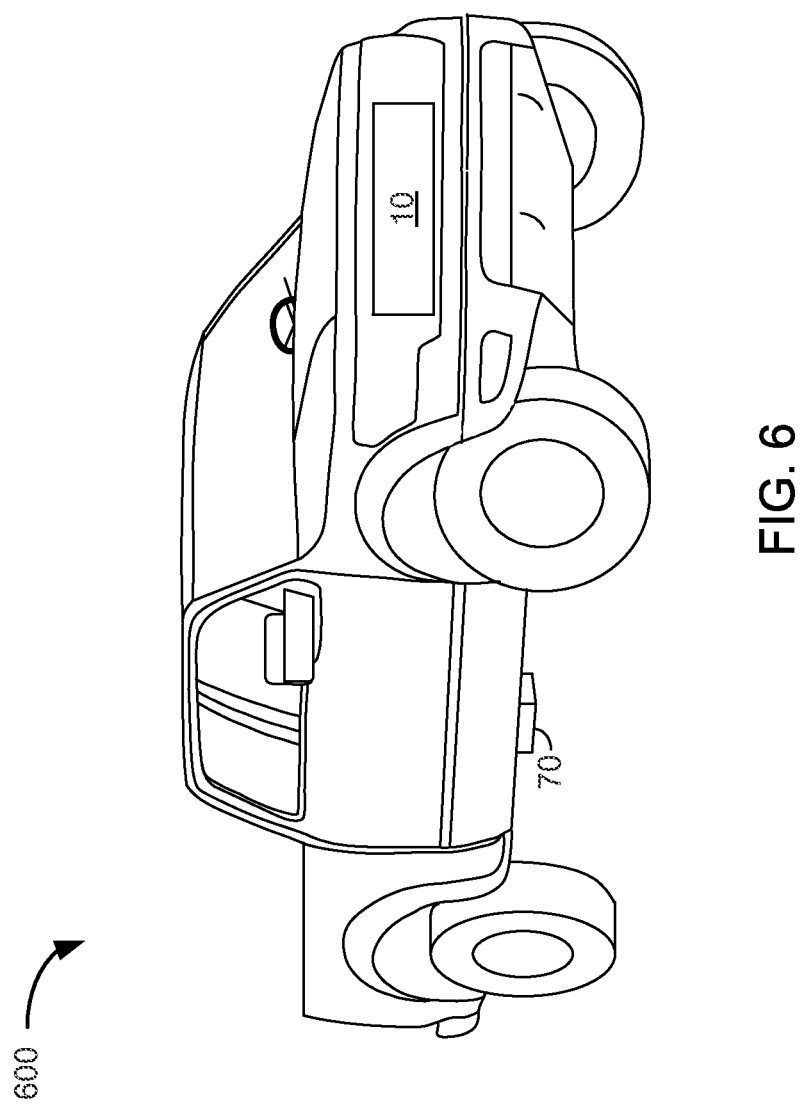
FIG. 6 is an example vehicle having an engine with an SCR catalyst.

Referring now to FIG. 5, an example flow chart of a method for increasing fuel economy of a vehicle having a SCR catalyst is shown. The method of FIG. 5 may be executed via instructions stored in non-transitory memory of a controller as is illustrated in FIG. 1. The method of FIG. 5 may adjust urea supplied to an exhaust system when a urea storage tank is not empty.

At 502, method 500 determines operating conditions. Operating conditions may include but are not limited to engine speed, engine load, SCR temperature, amount of urea stored in a tank, amount of $NH_3$ stored in a SCR catalyst. Engine speed and load as well as other sensed engine variables may be determined based on voltages or current output from sensors. In one example, the amount of $NH_3$ stored within a SCR catalyst may be determined as described in U.S. patent application Ser. No. 13/071,252 entitled "METHOD FOR CORRECTING AN ESTIMATE OF $NH_3$ STORED WITHIN A SELECTIVE CATALYST REDUCTION SYSTEM" and which is hereby incorporated by reference for all intents and purposes. Method 500 proceeds to 504 after engine operating conditions are determined.

At 504, method 500 determines baseline urea use and refill intervals. The baseline urea refill interval may be predetermined and stored in memory. In one example, the baseline urea refill interval is equivalent to an engine operating time or vehicle distance traveled using a single tank of fuel. In another example, the baseline urea refill interval is equivalent to an engine operating time or vehicle distance traveled suitable for an oil change interval. For example, an oil change interval may be determined to be 6,000 kilometers (KM). Likewise, the baseline urea refill interval is 6,000 kilometers. Other baseline urea refill intervals may be provided based on urea tank volume and other variables, if desired.

Method 500 also determines a baseline urea use interval at 504. In one example, the baseline urea use interval is determined based on an amount of urea used over a prescribed vehicle travel distance or engine operating time. For example, an amount of urea injected to an exhaust system may be determined from an amount of time a urea injector is turned on and a pressure at which urea is provided to the injector. A urea injector transfer function describes a flow rate through the urea injector when urea is provided to the injector at a given pressure. The urea flow rate is multiplied by the amount of time the urea flow rate is on to determine the amount of urea injected. The distance traveled or amount of engine operating time is divided by an amount of urea injected into the exhaust system to provide a baseline urea use rate. The rate of urea use may be averaged over a prescribed vehicle travel distance or engine operating time to provide an average baseline urea use rate. The baseline urea use interval may be determined via multiplying the amount of urea stored in the urea tank by the average urea use rate. Thus, the baseline urea use interval is an engine operating time or vehicle travel distance that urea in the urea storage tank may be expected to provide. The baseline urea use interval may be periodically determined and updated during engine operation. Method 500 proceeds to 506 after the urea use and refill intervals are determined.

At 506, method 500 judges whether or not conditions are present to allow entry into a fuel economy increase mode. In one example, permission to enter fuel economy increase mode may be provided when a SCR coupled to the engine is operating in a predetermined range where SCR efficiency is greater than a threshold level. The SCR catalyst efficiency may be estimated based on SCR temperature. Thus, as shown in FIG. 2, permission to a fuel economy mode may be provided when SCR temperature is between 185° C. and 390° C. at which time the predetermined SCR efficiency is 90 percent. In this way, permission to enter the fuel economy mode may be provided based on SCR temperature which correlates to a SCR efficiency. In other examples, permission to enter fuel economy mode may be provided when NOx sensors positioned fore and aft of the SCR indicate SCR efficiency greater than a threshold efficiency (e.g., 95% efficiency). For example, if a NOx sensor positioned upstream of the SCR indicates 1.0 grams/second of NOx and a downstream NOx sensor indicates 0.045 grams/second of NOx, it may be determined that entry into fuel economy mode is permitted. If entry into fuel economy mode is permitted, the answer is yes and method 500 proceeds to 520. If entry into fuel economy mode is not permitted at present conditions, the answer is no and method 500 proceeds to 510.

At 510, method 500 judges whether or not operating conditions are close to conditions that permit entry into fuel economy mode. In one example, it may be judged that operating conditions are close to conditions that permit entry into fuel economy mode when SCR efficiency is within a predetermined threshold range of a desired SCR efficiency. The SCR efficiency may be estimated from SCR temperature or from NOx sensors positioned upstream and downstream of the SCR. In other examples, an amount of energy expended to reach conditions where entry into fuel economy mode is compared to an amount of energy that can be conserved if the engine were to operate in fuel economy mode for a predetermined amount of time. For example, an estimate of an amount of post injected fuel (e.g., fuel injection late in a power stroke or during an exhaust stroke) necessary to increase SCR temperature and efficiency to a predetermined level may be compared against an amount of fuel conserved by operating the engine with a lower EGR amount for a predetermined amount of time. The amount of fuel necessary to increase SCR temperature and the amount of fuel conserved while operating the engine with a lower amount of EGR may be empirically determined and stored in memory. In one example, an amount of fuel injected to raise a SCR catalyst by a specified temperature (e.g., 5° C.) is compared to an amount of fuel conserved by decreasing an EGR amount when the SCR is in an efficient conversion state (e.g., SCR temperature greater than a threshold temperature) for a predetermined amount of time (e.g., 1 minute). If method 500 judges that 0.1 liters of fuel is required to increase the SCR temperature to a temperature where the SCR is operating with a threshold efficiency, and 0.15 liters of fuel can be conserved by operating the engine with reduced EGR for 1 minute when the SCR catalyst operating at the threshold efficiency, then method 500 will provide the post injected fuel to elevate the SCR temperature and then reduce EGR amount to conserve the 0.05 liters of fuel. If method 500 judges that operating conditions are close to conditions to permit entry into fuel economy mode, the answer is yes and method 500 proceeds to 512. Otherwise, the answer is no and method 500 proceeds to 514.

At 512, method 500 adjusts engine operation to reach conditions that permit entry into fuel economy mode. In one example, an amount of post internal combustion (e.g., fuel injected late is a power stroke or during an exhaust stroke) fuel can be increased to adjust engine operation so that the SCR will reach conditions that allow the engine reach and enter a fuel economy increase mode. In other examples, fuel injection timing may be retarded and boost may be decreased so as to increase exhaust temperature and thereby increase SCR conversion efficiency. Method 500 proceeds to exit after engine operation is adjusted to reach fuel economy increase mode.

At 514, method 500 determines a base EGR amount, fuel injection timing, and boost amount. In some examples, method 500 may also determine a base spark advance. In one example, parameters including the base EGR amount, base fuel injection timing, fuel injection pressure, and base boost amount are empirically determined and stored in memory. The parameters may be retrieved from memory via indexing tables or functions in response to engine speed and torque demand. In one example, the torque demand may be based on a position of an accelerator pedal. EGR amount, fuel injection pressure, fuel injection timing (e.g., number of pilot fuel injections, timing of pilot fuel injections, amount of fuel in each fuel injection during a cylinder cycle), and boost are provided at the levels output by the tables via adjusting an EGR valve, fuel injector timing, fuel metering valve position, fuel rail pressure valve control pressure, and turbocharger vanes or waste gate. Method 500 proceeds to 516 after base EGR amount, fuel pressure, fuel injection timing, and boost amount are determined.

At 516, method 500 adjusts the urea injection flow rate to the engine exhaust system to meet engine/vehicle emission requirements while the engine is operating with base EGR, injection timing, and boost amount. In one example, the urea flow rate is empirically determined and stored in tables in memory. The urea flow rate tables may be indexed via present engine speed and torque demand values or in response to base EGR rate, injection timing, and boost amount. The values in the urea flow rate tables are commanded to the urea injector and the urea pump. The urea injector turn-on time and the urea pump injection pressure are adjusted via transfer functions that relate urea flow rate to injector on time and urea pressure. The urea injector and pump are then operated to provide the desired urea flow rate. Method 500 proceeds to 518 after the urea flow is adjusted.

At 518, method 500 outputs base EGR, fuel injection pressure, fuel injection timing, and boost amount. The base EGR amount is provided via adjusting a position of an EGR valve to a position that provides a desired EGR amount given the pressure between the exhaust system and the intake manifold. In other examples, the EGR amount may be adjusted via changing an amount of valve opening time overlap between intake and exhaust valves. For example, EGR amount may be decreased by decreasing an amount of valve opening time between intake and exhaust valves. Fuel injector timing is adjusted by beginning fuel injection at an earlier crankshaft position during a cycle of a cylinder. Fuel pressure may be adjusted via adjusting a fuel pump metering valve or a fuel rail pressure control valve. Boost amount may be adjusted via adjusting a position of a turbocharger waste gate, adjusting turbocharger vane position, or adjusting a position of a bypass valve. Method 500 proceeds to exit after EGR, fuel injection timing, and boost are adjusted.

At 520, method 500 judges whether or not an amount of urea stored in a urea storage tank is greater than an amount of urea estimated to reach a urea refill interval. For example, if the urea refill interval at 504 is determined to be 500 KM, method 500 subtracts the baseline urea use interval from the baseline urea refill interval as determined at 504. If the result is negative, it may be determined that there is an excess amount of urea stored in the urea tank for the engine/vehicle to meet the urea refill interval. If the result is positive, it may be determined that there is less urea stored in the urea tank than is desirable to meet the urea refill interval. If method 500 judges that the amount of urea stored in the urea tank is greater than an amount for the engine/vehicle to reach the refill interval, the answer is yes and method 500 proceeds to 526. Otherwise, the answer is no and method 500 proceeds to 522.

At 522, method 500 reduces an amount of urea injected to an exhaust system upstream of an SCR. The amount of urea injected may be decreased in response to the efficiency of the SCR. The SCR efficiency may be estimated via SCR temperature or based on a difference in output of a NOx sensor positioned upstream of the SCR and a NOx sensor positioned downsteam of the SCR. For example, if SCR NOx conversion efficiency is higher than a NOx conversion efficiency that provides a desired vehicle emissions level, the amount of urea injected is decreased. In some examples, the amount of urea injected may be reduced when the SCR NOx conversion efficiency exceeds a NOx conversion efficiency that provides a desired vehicle emission level plus a factor of additional NOx conversion efficiency. The amount of urea injected may be reduced proportionately or as a function of the NOx conversion efficiency that is greater than a threshold NOx efficiency. Method 500 proceeds to 524 after the after the amount of urea injected to the exhaust system upstream of the SCR is reduced.

At 524, method 500 outputs base EGR, base fuel injection pressure, base fuel injection timing, and base boost. The base EGR, fuel injection timing, and boost are output as described at 514. Method 500 proceeds to exit after base EGR, base fuel injection pressure, base fuel injection timing, and base boost are output.

At 526, method 500 determines fuel economy (FE) mode EGR amount, fuel injection timing, and boost amount. In some examples, method 500 may also determine a fuel economy base spark advance. Parameters including the FE mode EGR amount, FE mode fuel injection timing, FE mode fuel injection pressure, and FE mode boost amount are empirically determined and stored in a second group of tables in memory similar to the tables described at 514. However, the tables at 526 provide for increased FE as compared to the output of tables at 514. The parameters may be retrieved from memory via indexing tables or functions in response to engine speed and torque demand. EGR amount, fuel injection pressure, fuel injection timing (e.g., number of pilot fuel injections, timing of pilot fuel injections, amount of fuel in each fuel injection during a cylinder cycle), and boost are provided at the levels output by the tables via adjusting an EGR valve, fuel metering valve position, fuel rail pressure valve control pressure, injector timing, and turbocharger vanes or waste gate. Method 500 proceeds to 528 after FE mode EGR amount, FE mode fuel pressure, FE mode fuel injection timing, and FE mode boost amount are determined.

At 528, method 500 increases a urea injection amount in response to a level that allows the urea refill interval to be met. For example, if based on the average urea use rate the baseline urea use interval is 500 KM and the urea refill interval is 300 KM based on distance the vehicle has traveled or engine operating time, the urea injection amount can be increased so that the urea use interval is driven toward the urea refill interval. In one example, the urea injection amount is increased proportionately with a difference in the urea use interval and the urea refill interval. The urea use interval and refill interval may be updated during a vehicle drive cycle. The refill interval is at a maximum value when the urea tank is filled and decreases as urea is injected until the urea tank is refilled. The urea use interval may also be updated several times during a vehicle drive cycle as the average urea use rate and urea use rate change. Method 500 proceeds to 530 after the urea injection amount is increased.

At 530, method 500 limits the amount of urea injected to the exhaust system. The urea flow rate into the exhaust is limited based on deposits that may form in the exhaust system. In one example, the urea flow rate into the exhaust is limited based on exhaust flow rate and exhaust temperature. For example, empirically determined urea flow rates that reduce urea deposits within the exhaust system are empirically determined and stored in a table in memory. Exhaust mass flow and exhaust temperature index the table and the urea flow rate limit is output. The commanded urea flow rate is limited by the urea flow rate limit. Method 500 proceeds to 532 after the urea flow rate is limited due to urea deposits.

At 532, method 500 determines EGR amount, urea injection amount, fuel injection timing, and boost adjustments in response to an amount of $NH_3$ stored in a SCR catalyst and/or SCR catalyst temperature. In one example, the EGR amount provided to an engine is adjusted based on an amount of $NH_3$ stored within a SCR catalyst as shown and explained with regard to FIG. 3. Further, a function or factor based on SCR temperature adjusts the EGR amount. In particular, an EGR gain term is adjusted in response to the amount of $NH_3$ stored in a SCR catalyst and/or SCR catalyst temperature. The output from the base EGR amount table is subtracted from the FE mode EGR table and the result is multiplied by the EGR gain term and then added to the base EGR amount. For example, where the base EGR amount 30%, the FE mode EGR is 25%, and the EGR gain is 0.75 and increasing as the amount of $NH_3$ stored within the SCR increases, the output EGR amount is (25−30)*0.75+30= 26.5. The EGR gain term is a value of less than one for a SCR storing $NH_3$ at or greater than a threshold $NH_3$ storage capacity of the SCR, and the EGR gain term approaches a value of one as $NH_3$ stored in the SCR is reduced below the threshold $NH_3$ storage capacity of the SCR.

Similarly, the gain terms for fuel pressure, fuel injection timing, and boost amount are adjusted in response to the amount of $NH_3$ stored on the SCR and SCR temperature. The injector timing gain increases to advance start of injection timing as the amount of $NH_3$ stored on the SCR increases, and the injector timing gain decreases to retard start of injection timing as the amount of $NH_3$ stored on the SCR decreases. For example, the start of fuel injection timing is advanced as a function of increasing $NH_3$ stored within the SCR. In one example, the fuel injection amount is advanced a crankshaft degree for each predetermined percent increase of $NH_3$ stored within the SCR. The boost gain decreases to reduce boost as the amount of $NH_3$ stored on the SCR increases, and the boost gain increases to increase boost as the amount of $NH_3$ stored on the SCR decreases. In spark ignited engines, spark timing may be advanced toward MBT as an amount of $NH_3$ stored on the SCR increases.

The urea injection amount is increased in proportion to the increase in engine NOx output. For example, engine NOx output may be determined via sensor 126 and the urea injection amount may be increased in proportion to the engine NOx increase. The urea injection amount may also be decreased in proportion to the amount of NOx reduction when the EGR amount is increased. Method 500 proceeds to 534 after the engine EGR amount, fuel pressure, engine fuel injection timing, and boost are adjusted.

In one example, where EGR amount is decreasing, the quantity of fuel injected to pilot fuel injections is increased via adjusting fuel injector timing. Further, pilot fuel injection start of injection timing may be decreased as the amount of EGR decreases. Further still, the amounts of boost and fuel pressure may be decreased as the amount of EGR supplied to the engine decreases.

In another example, instead of interpolating between base and FE mode tables, base tables are applied when $NH_3$ stored in a SCR is less than a threshold level or amount. FE mode tables are applied when $NH_3$ stored in the SCR is greater than the threshold level or amount. Such operation is provided via a curve similar to 306 in FIG. 3.

At 534, method 500 adjusts engine EGR amount, injection timing, urea injection amount, fuel pressure, and boost to increase engine and vehicle fuel economy. The engine EGR amount may be reduced via adjusting a position of a valve or cam timing as described at 518. Further, start of fuel injection timing is advanced relative to crankshaft position. Boost is also reduced via adjusting vane position of a turbocharger or a compressor bypass valve as described at 518. Reducing boost increases exhaust temperatures while advancing injection timing reduces exhaust temperatures. Thus, fuel injection start of injection timing adjustments may be counteracted or balanced via reducing boost pressure. Method 500 exits after EGR amount, fuel injection timing, and boost are adjusted. The amount of urea injected may be increased with increasing engine out NOx via increasing injection duration and/or urea injection pressure.

Thus, the method of FIG. 5 provides for operating an engine, comprising: adjusting an EGR amount supplied to an engine in response to an amount of $NH_3$ stored within a SCR catalyst and an amount of urea stored in a tank. The method includes where adjusting the EGR amount includes decreasing the EGR amount supplied to the engine when the amount of urea stored in the tank exceeds an estimate of an amount of urea desired for a vehicle to reach a predetermined condition related to an amount of urea in the tank. In this way, engine fuel economy can be increased during conditions of a SCR where the SCR is more efficient.

The method also includes where the predetermined condition is a fuel tank refilling event. The method further includes where the predetermined condition is an end of an oil change interval. The method also includes where adjusting the EGR amount includes decreasing the EGR amount supplied to the engine when the amount of $NH_3$ stored on the SCR catalyst is greater than a threshold amount. The method includes where adjusting the EGR amount includes increasing the EGR amount supplied to the engine when the amount of $NH_3$ stored on the SCR catalyst is less than a threshold amount. The method also includes where the EGR amount supplied to the engine is adjusted in response to the amount of $NH_3$ stored within the SCR catalyst only when a temperature of the SCR catalyst is within a predetermined range. The method further comprises adjusting boost or fuel injection starting timing in response to the amount of $NH_3$ stored within the SCR catalyst and the amount of urea stored in the tank.

In one example, the method of FIG. 5 also provides for a method for operating an engine, comprising: adjusting an EGR amount supplied to an engine in response an amount of urea stored in a tank; limiting an amount of urea injected to an exhaust system upstream of the SCR catalyst in response to an estimate of deposits forming in the exhaust system; and limiting a reduction in the EGR amount supplied to an engine in response to the amount of urea injected. The method also includes where the deposits are formed from the amount of urea injected, and where an estimate of deposits is based on engine exhaust mass flow rate and exhaust gas temperature.

In some examples, the method further comprises where the EGR amount supplied to the engine also adjusted in response to an amount of $NH_3$ stored within a SCR catalyst. The method also includes where the EGR amount supplied to the engine is increased when the amount of $NH_3$ stored within the SCR catalyst is decreasing. Thus, the method of FIG. 5 takes advantage of efficient SCR operation during selected conditions. The method includes where the EGR amount supplied to the engine is decreased when the amount of $NH_3$ stored within the SCR catalyst is increasing. The method further comprises advancing fuel injection start of injection timing or decreasing engine boost when the EGR amount supplied to the engine is decreased. The method further comprises decreasing the amount of urea injected to the exhaust system when the amount of urea stored in the tank is less than an estimate of an amount of urea necessary for a vehicle to reach a predetermined condition.

In still another example, the method of FIG. 5 provides for operating an engine, comprising: adjusting engine operating conditions to enter a fuel economy mode in response to performance of a SCR catalyst being within a predetermined range of performance; and adjusting an EGR amount supplied to an engine in response to performance of the SCR catalyst reaching the threshold level. In this way, engine fuel economy may be increased during efficient SCR operation.

The method includes where the EGR amount is further adjusted in response to an amount of $NH_3$ stored within the SCR catalyst, SCR catalyst temperature, and an amount of urea stored in a tank after performance of the SCR catalyst reaches the threshold level. The method also includes where the threshold level is a predetermined efficiency, and further comprising decreasing an amount of urea injected to an exhaust system that includes the SCR catalyst when the amount of urea stored in the tank is not greater than an amount of urea for a vehicle to reach a predetermined condition. The method also includes where boost is decreased or start of fuel injection timing is advanced when the EGR amount supplied to the engine decreases. The method further comprises increasing an amount of urea injected to an exhaust system including the SCR catalyst that increases efficiency of the SCR catalyst while allowing the vehicle to reach a predetermined condition related to an amount of urea in the tank.

Referring now to FIG. 6, a vehicle in which EGR amount is adjusted. Vehicle 600 includes engine 10 and SCR 70. Engine 10 may propel vehicle 600 on a road during various driving conditions. SCR 70 processes exhaust gas from engine 10 when engine 10 is operating.

As will be appreciated by one of ordinary skill in the art, the method described in FIG. 5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps, methods, or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method for operating an engine, comprising:
adjusting an EGR amount supplied to an engine in response to an amount of $NH_3$ stored within an SCR catalyst and an amount of urea stored in a tank.

2. The method of claim 1, where adjusting the EGR amount includes decreasing the EGR amount supplied to the engine when the amount of urea stored in the tank exceeds an estimate of an amount of urea desired for a vehicle to reach a predetermined condition related to the amount of urea in the tank.

3. The method of claim 2, where the predetermined condition is a fuel tank refilling event.

4. The method of claim 2, where the predetermined condition is an end of an oil change interval.

5. The method of claim 1, where adjusting the EGR amount includes decreasing the EGR amount supplied to the engine when the amount of $NH_3$ stored within the SCR catalyst is greater than a threshold amount, and further comprising adjusting an amount of urea injected in response to the amount of urea stored in the tank being greater or less than an amount to reach a predetermined urea refill interval.

6. The method of claim 1, where adjusting the EGR amount includes increasing the EGR amount supplied to the engine when the amount of $NH_3$ stored within the SCR catalyst is less than a threshold amount.

7. The method of claim 1, where the EGR amount supplied to the engine is adjusted in response to the amount of $NH_3$ stored within the SCR catalyst only when a temperature of the SCR catalyst is within a predetermined range.

8. The method of claim 1, further comprising adjusting fuel injection starting timing or boost amount in response to the amount of $NH_3$ stored within the SCR catalyst and the amount of urea stored in the tank, and where the EGR amount supplied to the engine is adjusted while a urea injection system is allowed to inject $NH_3$.

9. A method for operating an engine, comprising:
adjusting an EGR amount supplied to an engine in response an amount of urea stored in a tank while a urea injection system is allowed to inject $NH_3$;
limiting an amount of urea injected to an exhaust system upstream of an SCR catalyst in response to an estimate of deposits forming in the exhaust system; and
limiting a reduction in the EGR amount supplied to the engine in response to the amount of urea injected.

10. The method of claim 9, where the deposits are formed from the amount of urea injected, and where the estimate of deposits is based on engine exhaust mass flow rate and exhaust gas temperature.

11. The method of claim 9, further comprising where the EGR amount supplied to the engine is also adjusted in response to an amount of $NH_3$ stored within the SCR catalyst, and further comprising adjusting the amount of urea injected in response to the amount of urea stored in the tank being greater or less than an amount to reach a predetermined urea refill interval.

12. The method of claim 11, where the EGR amount supplied to the engine is increased when the amount of $NH_3$ stored within the SCR catalyst is decreasing.

13. The method of claim 11, where the EGR amount supplied to the engine is decreased when the amount of $NH_3$ stored within the SCR catalyst is increasing.

14. The method of claim 13, further comprising advancing fuel injection start of injection timing or decreasing engine boost when the EGR amount supplied to the engine is decreased.

15. The method of claim 9, further comprising decreasing the amount of urea injected to the exhaust system when the amount of urea stored in the tank is less than an estimate of an amount of urea necessary for a vehicle to reach a predetermined driving distance.

16. A method for operating an engine, comprising:
adjusting engine operating conditions to enter a fuel economy mode in response to performance of an SCR catalyst being within a predetermined range of performance;
adjusting an EGR amount supplied to the engine in response to performance of the SCR catalyst reaching a threshold level; and
adjusting an amount of urea injected in response to an amount of urea stored in a tank being greater or less than an amount to reach a predetermined urea refill interval.

17. The method of claim 16, where the EGR amount is further adjusted in response to an amount of $NH_3$ stored within the SCR catalyst, SCR catalyst temperature, and the amount of urea stored in the tank after performance of the SCR catalyst reaches the threshold level.

18. The method of claim 16, where the threshold level is a predetermined efficiency, and further comprising decreasing an amount of urea injected to an exhaust system that includes the SCR catalyst when the amount of urea stored in the tank is not greater than an amount of urea for a vehicle to reach a predetermined driving distance.

19. The method of claim 16, where boost is decreased or start of fuel injection timing is advanced when the EGR amount supplied to the engine decreases.

20. The method of claim 16, further comprising increasing an amount of urea injected to an exhaust system including the SCR catalyst that increases efficiency of the SCR catalyst while allowing a vehicle to reach a predetermined driving distance related to the amount of urea in the tank.

* * * * *